United States Patent [19]
Weppert et al.

[11] Patent Number: 5,164,204
[45] Date of Patent: Nov. 17, 1992

[54] MODULAR CORRUGATOR

[75] Inventors: Rainer Weppert, Hassfurt; Gerhard Henninger, Oberhaid, both of Fed. Rep. of Germany

[73] Assignee: Frankische Rohrwerke Gebr. Kirchner GmbH & Co., Konigsberg, Fed. Rep. of Germany

[21] Appl. No.: 720,820

[22] PCT Filed: Aug. 16, 1990

[86] PCT No.: PCT/EP90/01350
§ 371 Date: Jul. 12, 1991
§ 102(e) Date: Jul. 12, 1991

[87] PCT Pub. No.: WO91/03366
PCT Pub. Date: Mar. 21, 1991

[30] Foreign Application Priority Data
Sep. 11, 1989 [DE] Fed. Rep. of Germany ....... 3930318

[51] Int. Cl.⁵ .................. B29C 53/30; B29C 35/16
[52] U.S. Cl. .................. 425/336; 425/325; 425/369; 425/392; 425/396
[58] Field of Search .............. 425/136, 151, 154, 233, 425/303, 324.1, 325, 326.1, 336, 342.1, 369, 388, 392, 396, 405.1, DIG. 239

[56] References Cited
U.S. PATENT DOCUMENTS

| | | | |
|---|---|---|---|
| 3,776,679 | 12/1973 | Hegler | 425/396 |
| 3,981,663 | 9/1976 | Lupke | 425/396 |
| 4,021,178 | 5/1977 | Braun | 425/396 |
| 4,674,969 | 6/1987 | Korn | 425/392 |

FOREIGN PATENT DOCUMENTS

| | | | |
|---|---|---|---|
| 1189269 | 6/1985 | Canada | 425/336 |
| 1303583 | 2/1973 | Fed. Rep. of Germany . | |

Primary Examiner—Jay H. Woo
Assistant Examiner—James P. Mackey
Attorney, Agent, or Firm—Armstrong, Nikaido, Marmelstein, Kubovcik & Murray

[57] ABSTRACT

A corrugator for ribbing pipes includes two synchronously circulating chains of mold halves, a guide device for the mold halves having an input zone in which the associated mold halves are brought into engagement with each other, a molding zone in which a central channel is provided for guiding the engaged mold jaws and an output zone in which the mold halves are again separated from each other, as well as return guides for the mold halves on the path between the output and input zones and cooling apparatus for cooling at least the central channel with a coolant. A plurality of hollow profile modules is provided for forming the molding zone, each module being provided with a central cavity for the cooling apparatus and two lateral guide portions. Modules are arranged in pairs joining each other transversely of the production direction of the corrugator, and a plurality of module pairs are arranged adjoining each other in series in the production direction of the corrugator. The adjoining lateral guide portions of a module pair form a section of the central channel and the outwardly disposed lateral guide portions of the module pairs form return guide channels of the section.

12 Claims, 4 Drawing Sheets

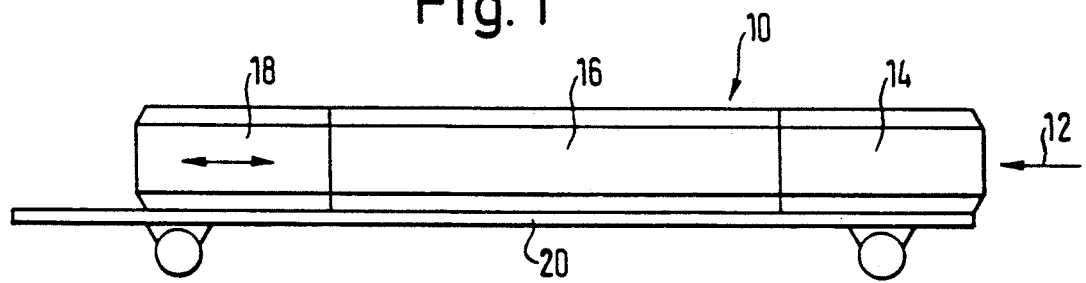
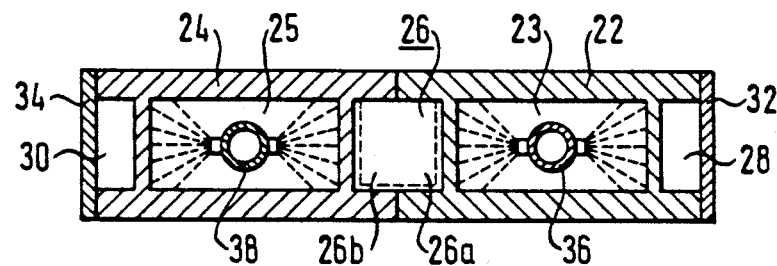
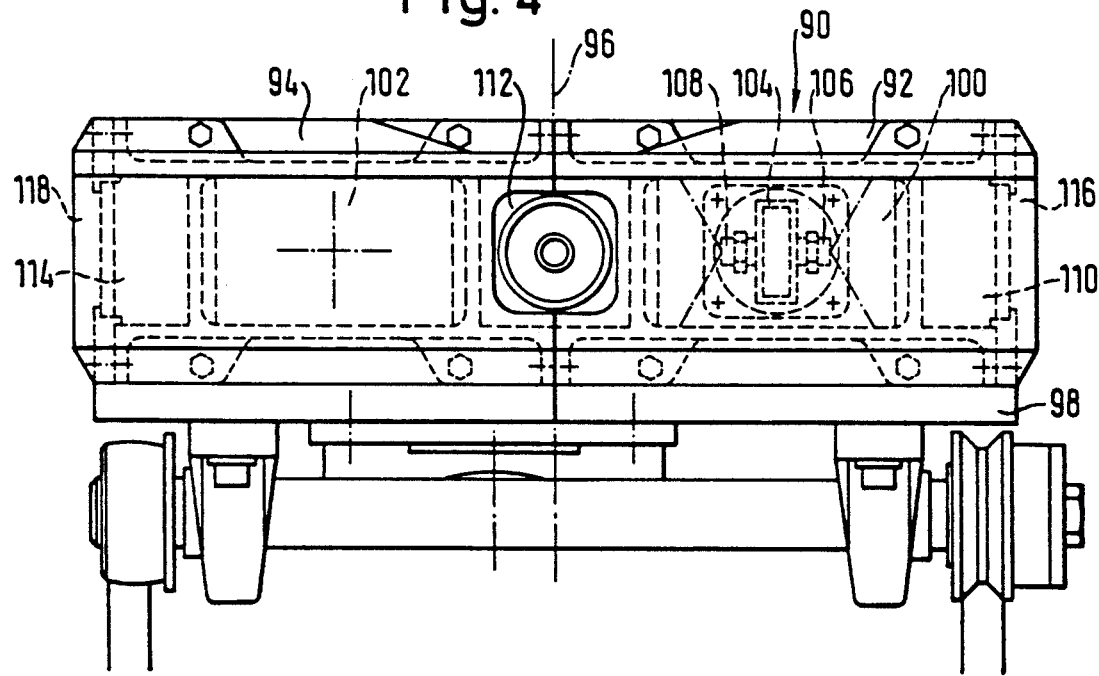

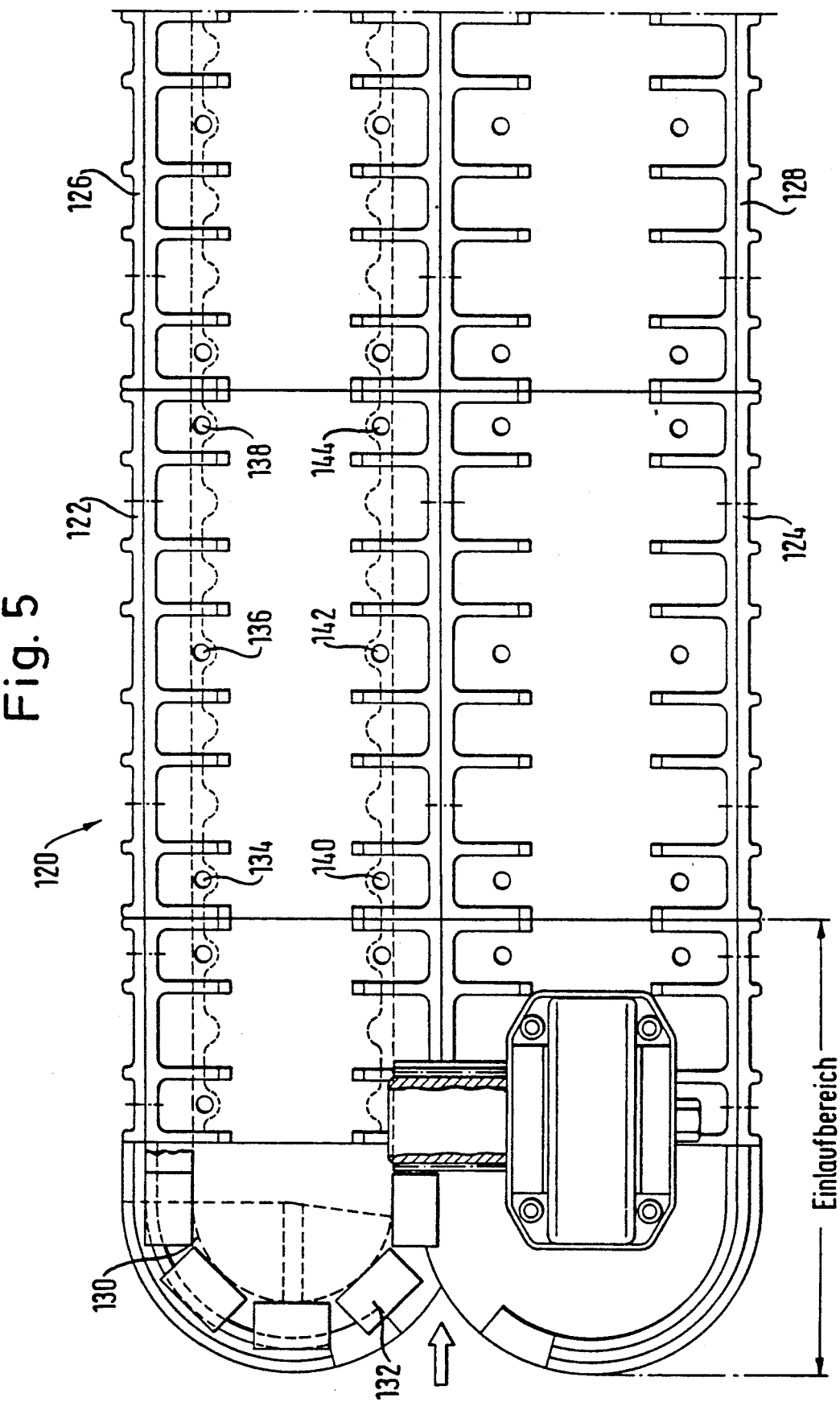

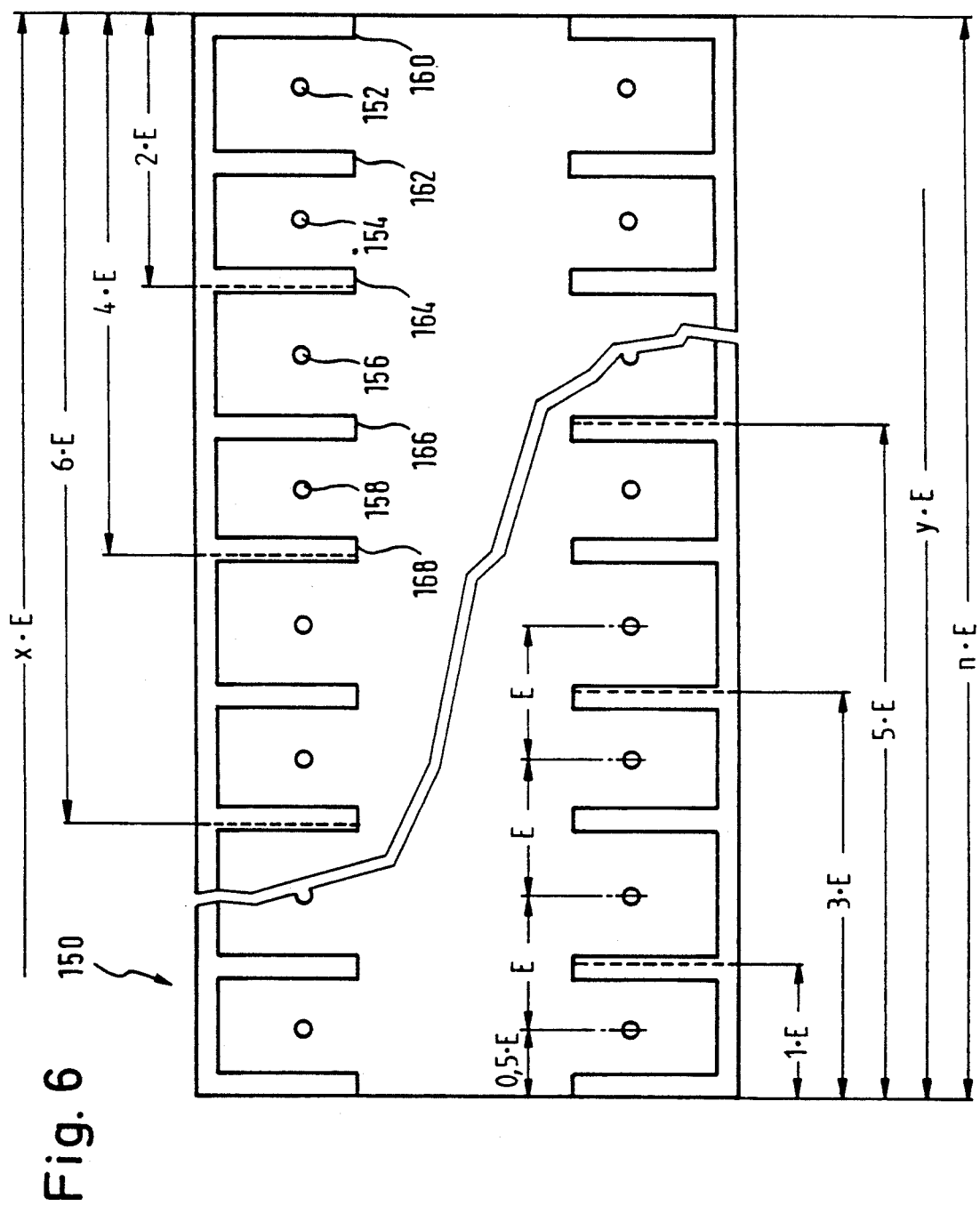

MODULAR CORRUGATOR

BACKGROUND OF THE INVENTION

The invention relates to a corrugator for ribbing plastic pipes comprising two synchronously circulating chains of mold halves, guide means for the mold halves having an input zone in which the associated mold halves are brought into engagement with each other, a molding zone in which a central channel is provided for guiding the engaged mold jaws and an output zone in which the mold halves are again separated from each other, as well as return guides for the mold halves on the path between the output and input zones and cooling means for cooling at least the central channel with a coolant.

In such a conventional corrugator usually the molding zone with the central channel is separated from the return guides arranged on the two longitudinal sides thereof. In the running direction of the central channel in the two side walls thereof meander-like coolant passages are provided and the sealing outwardly is by suitable sealing means and an outwardly arranged plate at each of the two longitudinal sides. The cooling passages are relatively complicated and therefore expensive to make; this is also enhanced by the necessary seals. Furthermore, the setting up of such a corrugator involves a relatively great amount of work. This is essentially due to the fact that the central channel and each of the two return guides must be separately aligned.

If the return guides are to be cooled as well, meander-like coolant passages are also to be provided in the corresponding walls of the return guides and just like the central channel said passages must be sealed via suitable sealing means and an outer plate. This makes the conventional corrugator still more complicated to manufacture and difficult to handle.

The central channel in known corrugators is subject to a relatively high wear because the running surface for the mold halves which are pressed against each other in the central channel are subjected to the forces arising in the forming of the ribbing (caused by the excess pressure in the interior of the plastic pipe).

Furthermore, the known corrugator arrangement is not very flexible from the point of view that, by the fixed cross-section and the fixed form of the coolant passages, it is difficult to vary the cooling power within a larger range. This is a disadvantage in particular when a change of the particular plastic used is carried out frequently.

Furthermore, a corrugator has already been proposed which has a very complicatedly formed lower portion and a cover placed thereon for sealing. In the lower part in the center of the central channel, in each case separated on the outside on both sides by a wall, in substantially U-shaped manner a cavity is provided having in each case a spray cooling means for the central passage, and on the outside the two return guides are provided, once again separated via a wall. These five adjacently disposed upwardly open spaces are sealed by the common cover with suitable sealing means so that the spaces are upwardly closed. Admittedly, due to the spray cooling for the central channel the hitherto necessary coolant passages are dispensed with; however, said lower part can be made only at very high cost. The numerous sealing points between the cover and the lower part lead to having to adopt very complicated steps for the sealing or to an impairment of the operational reliability.

On occurrence of the relatively high wear of the central channel as described above the entire lower part and the cover must be replaced because both these parts form the central channel.

SUMMARY OF THE INVENTION

The invention therefore has as its object to provide a corrugator which is of simpler structure and is simpler to handle.

The present invention is based on the recognition that the central channel can be formed by placing two half channels against each other and such half channels can form either half a central channel or a return guide.

The problem is solved according to the present invention by a corrugator of the type set forth in the preamble which is modularly constructed and for this purpose comprises a plurality of hollow profile modules for forming the molding zone, each module comprises a cavity for a cooling means and is provided with two lateral guides, in each case two modules are arranged in pairs joining each other transversely of the production direction of the corrugator, the adjoining lateral guides of a module pair form a section of the central channel and the outwardly disposed lateral guides of the module pair form the return guides of said section, and in the production direction of the corrugator a plurality of module pairs are arranged adjoining each other in series.

The corrugator according to the present invention offers numerous advantages. Firstly, each module represents a relatively small component which is easy to make and easy to handle. Due to the configuration of each module as having a hollow profile with a cavity and two lateral guides, each module can for example be made as a casting and after the casting a corresponding fine working of the track surfaces for the mold halves can be carried out.

The configuration of the modules according to the invention as hollow profiles permits the provision of relatively thin wall thicknesses, thereby reducing the material expenditure, facilitating production and improving handleability.

Since the cavity is in any case connected to a fundamentally freely selectable cooling means, the sealing problems of the prior art regarding the cooling are considerably reduced because it is only necessary now to seal two abutting modules with respect to each other.

A particular advantage of the corrugator according to the invention resides however in that the lateral guides of each module can serve optionally to form the central channel and to provide the lateral guiding. Two modules arranged next to each other as a pair form the central channel with their facing lateral guides and the remaining outer lateral guides of the two modules form the two return guides for the mold halves. Now, when a predetermined wear of the central channel made in this manner is reached the two modules are separated from each other, each turned through 180° and again placed against each other, the previously outwardly disposed lateral guides now lying on the inside and forming a new central channel so far subjected to practically no wear whilst the two lateral guides hitherto forming the central channel now each lie on the outside and form the two return guides which are relatively uncritical as regards wear. This makes it possible practically to double the operating time of the corrugator as regards the wear of the central channel. The rotation of the modules can also be carried out in such a manner that compared with the previous position the modules are upside down, wherein a portion previously at the bottom now lies at the top.

Furthermore, the modular structure of the corrugator according to the invention provides increased flexibility. By removing or adding module pairs the corrugator can simply be modified in its length, that is its longitudinal extent in the production direction. This gives simple adaptation to the particular optimum conditions regarding the plastic used, the production output desired and the like. Due to this flexibility the corrugator can also be adapted in optimum manner to the particular length of different products and this reduces waste considerably.

Preferably, the length of each module in the production direction is substantially an integral multiple of a unit length. For this then makes it possible to further increase the flexibility as regards the longitudinal extent of the corrugator by shortening a module as required in units of this unit length; the unit length advantageously corresponds to the length of a mold half.

As already explained above, the configuration of the modules in accordance with the invention fundamentally permits the use of any desired cooling means due to the cavity provided for the cooling means. However, an embodiment of the invention is particularly advantageous in which in each cavity channel formed by a plurality of consecutively disposed modules a spray cooling means is provided which extends substantially over the entire length of the cavity channel and sprays the coolant onto the wall of the cavity adjoining the central channel. Since as mentioned at the beginning the wall thickness of the hollow profile modules can be made relatively small a good heat transfer to the central channel is ensured. Since by appropriate metering of the coolant in a spray cooling means the cooling power can be varied within relatively wide ranges this leads to improved flexibility of the entire corrugator. On the other hand, a spray cooling means is itself of relatively simple construction, and when required a spray cooling means can therefore be replaced by another spray cooling means provided with larger and/or more discharge openings when a higher cooling power is desired. A "spray cooling" in this connection is also to include a spray or cooling means or the like.

In particular with regard to increased production performances of the corrugator according to the invention it is advantageous for the spray cooling means to be configured also for spraying coolant onto the wall or walls of the cavity adjoining the return guide. The mold halves are then cooled during the return and this makes it possible to achieve a higher production output (cycle rate). Of course, the spray cooling for the central channel can also be made independent of the spray cooling of the return guide if this is desired because the cavity of the modules here allows the designer every possible freedom.

To improve the cooling of the mold halves in the return guides the latter are advantageously provided with externally attached pressure means, thereby forming closed return guide channels; the pressure means press the mold halves into the return guide and thus ensure improved contact to obtain better cooling.

The pressure means can be formed simply as plates which are each pressed or pulled via at least one spring in the direction towards the return guide. Adjustment of the spring force permits fine adaptation with regard to optimum cooling effect with the minimum possible wear of the return guides. Instead of the spring a suitable pneumatic, hydraulic or magnetic means or the like may be provided.

It has already been pointed out above that the modular structure of the corrugator according to the invention permits a simple adaptation in the longitudinal direction. A further important advantage of the modular arrangement resides in addition in a divisibility of the central channel in the transverse direction, i.e. transversely of the production direction. For in this case the modules arranged in a row consecutively in the production direction of the corrugator are simply separated from the corresponding opposite row, i.e. transversely of the production direction. This permits simple inspection and maintenance of the central channel. In accordance with the prior art, due to the substantially closed construction of the central channel, in particular in the event of production disturbances in which the corrugator came to a standstill whilst plastic was still being introduced into said corrugator, cleaning or repair took a great amount of time and involved correspondingly high costs and a danger of damage, in particular with regard to the long shutdown time of the corrugator. In contrast, in the corrugator according to the invention the one module row is removed from the others and the central channel becomes freely accessible. For the pressing together of the two module rows during operation or for moving the two module rows apart for maintenance and inspection work, advantageously a suitable means is provided which in operation presses the two module rows against each other but under predefinable conditions pulls the two module rows apart. This may for example be done pneumatically, hydraulically or mechanically.

Furthermore, with the corrugator according to the invention it is possible in a simple manner to achieve a socalled vacuum shaping of the plastic pipes. For this purpose, at least the cavity wall of each module adjoining the central channel is provided with one or more openings and means for generating a partial vacuum or an excess pressure in the cavity are connected to the latter. The partial vacuum in the cavity then pulls the plastic pipe outwardly via the openings. To retain the reversibility of the modules when this is done, i.e. the use of the lateral guides either for the central channel or the return guide, the cavity wall adjoining the return guide is preferably then likewise provided with one or more openings. This can be utilized for pulling the mold halves in the return guide against the track surface of the cavity wall by the partial vacuum in the cavity; this makes it possible where appropriate to dispense with the pressure means or pressure plates for the return guide. To reduce the friction between the modules and the mold halves in the central channel and thus to reduce the wear, and also the necessary drive power, a means for generating a partial vacuum can also be connected to such openings solely in the modules.

As already mentioned at the beginning the modules according to the invention can be made in simple and economic manner as castings, preferably cast iron castings.

Although the corrugator according to the invention, due to the aforementioned possibility of longitudinal division of the module rows, is particularly easy to maintain, certain disturbances cannot be excluded, for example a complete failure of the current supply for a production system comprising corrugator and associated extruder. On such a sudden power failure the corrugator comes to a standstill whilst due to the high pressure the extruder introduces still soft plastic pipe into the corrugator; the plastic then solidifies in the input zone of the corrugator and must be tediously removed.

To overcome this problem, according to a further development of the invention an unlocking means is provided on the corrugator which comprises a force storage means which under a predetermined disturbance condition is activated and rapidly disconnects the corrugator from the extruder associated therewith. The force storage means may for example be a spring accumulator, a compressed air accumulator or the like, i.e. should operate without electrical power supply, and the actuation of the unlocking means is preferably carried out in similar manner or by providing the energy necessary for the unlocking for example in an accumulator.

The invention will be explained hereinafter in detail with reference to examples of an embodiment illustrated in the drawings, from which further advantages and features will be apparent.

BRIEF DESCRIPTION OF THE DRAWINGS

FIG. 1 is a schematically highly simplified side view of a corrugator with input block, center section consisting of modules and output block;

FIG. 2 is a vertical cross-section through a corrugator according to an example of an embodiment of the present invention having two adjacently disposed modules forming between them a central channel;

FIG. 4 is a vertical cross-section through a corrugator according to an example of an embodiment of the present invention having two adjacently disposed modules (similar to FIG. 2) showing more detail;

FIG. 5 is a plan view of the front region of a corrugator according to an example of an embodiment of the present invention and FIG. 6 is a plan view of a subsection of a module according to an example of an embodiment of the present invention.

DESCRIPTION OF THE PREFERRED EMBODIMENT

Figure 3:
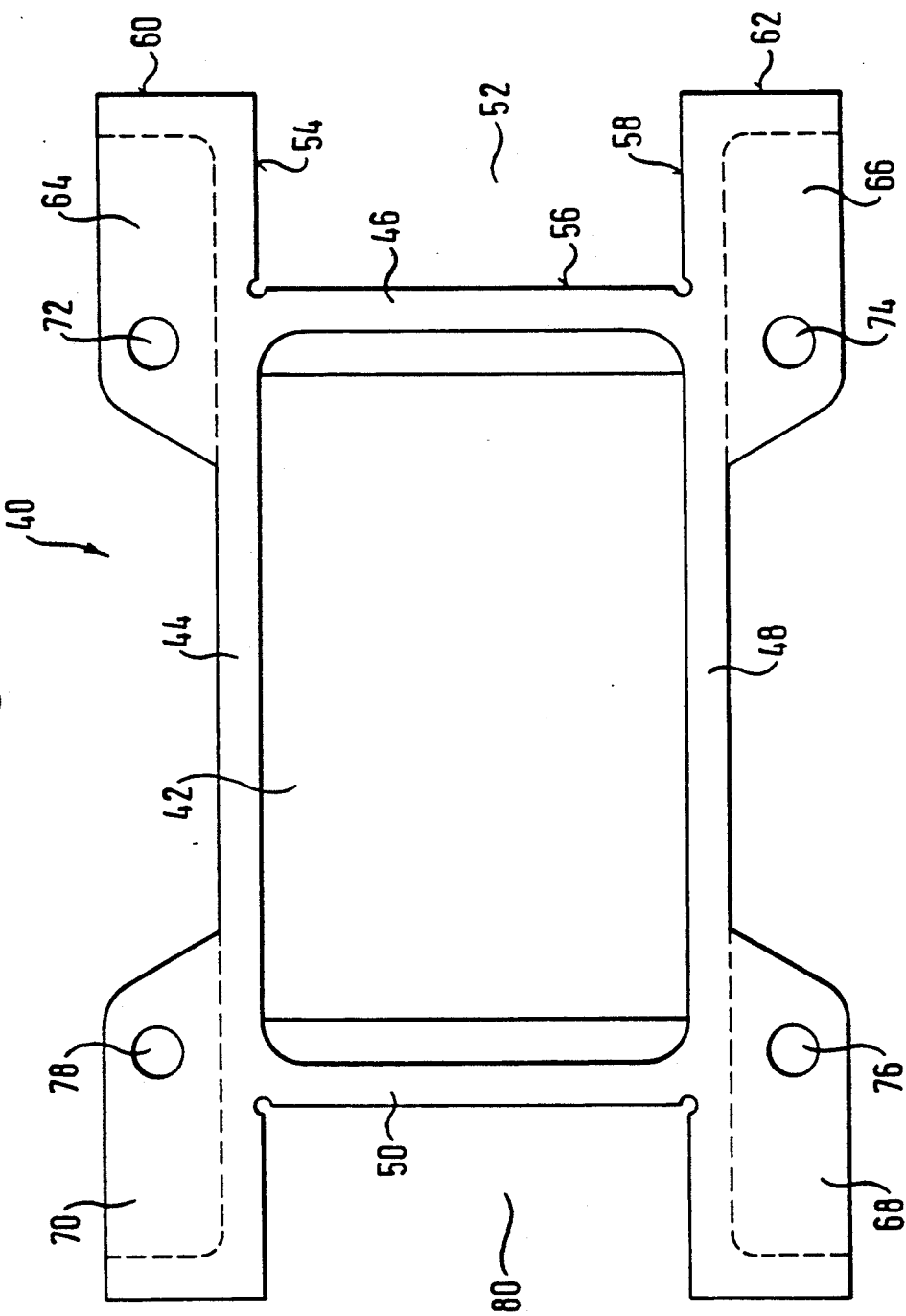
FIG. 3 is a vertical cross-section through a module according to an example of an embodiment of the present invention.

FIG. 1 shows schematically in greatly simplified manner the essential main sections of a corrugator 10 according to the present invention. A still plastic pipe runs in the direction of the arrow 12 from an extruder (not illustrated) into an input block 14 of the corrugator, through a central section 16 in which the plastic pipe is provided with ribs at its outer periphery by shaping by molding members, and leaves the corrugator 10 via an output block 18. The input block or input zone 14, the central section 16 and the output block 18 are arranged jointly on a machine table 20 of the corrugator 10.

The mode of operation of the corrugator will be explained hereinafter in further detail in conjunction with FIG. 5.

The cross-section illustrated in FIG. 2 through two adjacently disposed mold guide modules of the central section, as denoted in FIG. 1 by the reference numeral 16, is shown schematically highly simplified. Two adjacently disposed mold guide modules 22, 24 form between them a central channel 26 in which the respective associated mold halves (not illustrated) for shaping the plastic pipe run. The return of the mold halves then again separated is on the outside in return guide portions 28, 30 of the modules 22, 24.

The module 22 is constructed with a hollow profile and comprises a central cavity 23 in which a spray tube 36 is arranged which, as indicated by the dashed lines, sprays a coolant mainly onto the outer walls of the cavity which adjoin the return guide 28 or the guide 26a arranged symmetrically thereto. The return guide 28 is closed outwardly by a plate 32 which is pressed by a spring (not shown) in the direction towards the module 22.

The module 24 has a similar structure to the module 22 and thus comprises a cavity 25 with spray tube 38 arranged therein, a return guide 30 and the guide 26b formed symmetrically thereto.

The two guide portions 26a (of the module 22) and 26b (of the module 24) form together the central channel 26. The guides 26a, 28, 26b, 30 are constructed so that they are interchangeable. For example, each of the modules 22, 24 in FIG. 2 could be turned through 180° so that the two guides 28, 30 would then lie opposite each other and form together a central channel. Correspondingly, in this case the return guide of the module 22 would be formed by the guide 26a and correspondingly the return guide of the module 24 by the guide 26b.

Just like the return guide 28, the return guide 30 of the module 24 is outwardly closed by a spring-loaded plate 34. FIG. 3 explains with the aid of a cross-section through a module 40 the structure of such a module more exactly. In the center the module comprises a cavity 42 which is surrounded by four walls 44 (at the top), 46 (on the right), 48 (at the bottom) and 50 (on the left). On the right a guide 52 is provided for mold halves (not illustrated) and on the left a guide 80 in symmetrical arrangement therewith. The guide 52 comprises a vertical guide path 56, an upper guide path 54 and a lower guide path 58. This is exactly the same for the left guide 80, the reference numerals for the latter being omitted for simplification. The aforementioned turning of the modules can also be effected so that the previous lower/upper guide path becomes the upper/lower guide path. Fundamentally, a turning of a module through 180° about each of the three axes is possible.

The module 40 is provided with four webs 64, 66, 68 and 70, the webs 64, 66 having lateral engagement surfaces 60 and 62 respectively with which the module 40 is placed against a further module which is not illustrated and which is of corresponding form. The corresponding engagement surfaces on the webs 68, 70 are not provided with reference numerals.

In each of the webs 64, 66, 68 and 70 a through hole 72, 74, 76 and 78 respectively is provided. Said through holes 72–78 serve to connect together two modules adjoining each other in a row (cf. FIG. 5), for example by means of screws which project through the through holes 72–78 and are each tightened with a nut so that two consecutively disposed modules are firmly clamped against each other.

The cross-section according to FIG. 4 shows the arrangement of two adjacently disposed mold guide 92, 94 of a corrugator 90 in further detail.

The two modules 92, 94 abut each other at a vertical center line 96. The modules 92, 94 are mounted on a machine table 98 as will be explained in further detail hereinafter. The module 92 comprises a cavity 100 in which a spray tube 104 is provided which comprises a spray head 106 and a spray head 108. The spray cones of the spray head 106, 108 are indicated by dot-dashed lines. A return guide channel 110 is disposed towards the outside of the module 92 and is closed outwardly by a spring-loaded plate 116.

The other module 94 is correspondingly constructed and therefore comprises a cavity 102, a return guide channel 114 and a spring-loaded plate 118 closing the latter towards the outside. For simplicity, a spray head with associated means in the cavity 102 of the second module 94 is not illustrated.

The two modules 92, 94 form between them a central guide channel 112 in which a pipe is indicated.

The machine table 98 is held by means not provided with reference numerals such as a rod guide, bushes and the like. A division plane defining the longitudinal separating plane of the corrugator 90 extends along the vertical center line 96. Preferably, one row of the modules, for example that containing the module 94, is arranged stationarily and the other row of the modules, i.e. in this case containing the module 92, is made movable with respect to the division plane defined by the center line. The means necessary for this purpose are not illustrated in FIG. 4.

The plan view of a corrugator 120 illustrated in FIG. 5 explains the mode of operation of this means. In the direction of the arrow shown on the left in FIG. 5 a plastic pipe runs from an extruder into the input zone of the corrugator 120. The input zone is followed by a first pair of modules 122, 124 itself followed by a second pair of modules 126, 128 in the production direction of the corrugator 120. For the one row of modules 122, 126 arranged in series in the longitudinal direction of the corrugator 120 in highly simplified form a guide means 130 is illustrated for mold halves, of which only one mold half 132 is shown by way of example in FIG. 5. Such a mold half 132 runs at the top in FIG. 5 in the return region from right to left, then passes through a curve (in the region of the reference numeral 130) and then runs into the input zone in the production direction, i.e. in the direction of the arrow.

Synchronously therewith, at the bottom in FIG. 5 a corresponding mold half runs from right to left, traverses a semicircle and then runs together with the other mold half 132 into the input zone until at the end of the latter, i.e. just before entering the module pair 122, 124, a respective pair of associated mold halves combine to form a mold member which encloses the still deformable hose running in the central passage and forms the ribbing on the outer surface of the plastic pipe.

As an example for all the modules the module 122 is shown in FIG. 5 with six through holes 134, 136, 138, 140, 142, and 144 with the aid of which via screws (not shown) the module 122 is secured to a machine table, for example the machine table 98 of FIG. 4. Two consecutively disposed modules, for example the modules 122 and 126 or the modules 124, 128, are connected together in the manner explained above in conjunction with FIG. 3, i.e. secured to each other in the longitudinal direction of the corrugator, whilst the module rows 122, 126 or 124, 128 are secured to the machine table by means of through holes 134–144 as are shown in the module 122 in a manner representative for all the modules.

With the aid of a plan view of part of a module 150 FIG. 6 illustrates the configuration of the modules according to the invention.

Through holes, of which four are denoted here by way of example by the reference numerals 152, 154, 156 and 158, serve to secure the module 150 in the manner described above in connection with the module 122. The remaining through holes in FIG. 6 are not denoted by reference numerals.

It is further apparent from FIG. 6 that each module comprises on its upper side webs, five of which are denoted by way of example by the reference numerals 160, 162, 164, 166 and 168. These webs correspond to the webs 64–70 shown in cross-section in FIG. 3. They serve firstly to increase the dimensional stability of the module 150 and the webs arranged at each end, for example the web 160, for securing to the web provided at the end face of the adjoining module.

It is further apparent from FIG. 6 that the module 150 itself has a modular construction. Whereas the distances "E" between two adjacent through holes, for example the through holes 152, 154, are identical in each case, the length of the sections of different length of the module 150 provided between two webs alternates. The total length of the module 150 is substantially an integral (n) multiple of said unit length E so that should a module length less than the length of this module become necessary in the manufacture the module can be cut off transversely of its longitudinal extent, this preferably being done in units of the unit length E.

The cutting to length of a module is carried out in the manner indicated in FIG. 6. It should be remembered here that the web or the rib at which the cutting takes place must be worked to ensure a planar engagement of two modules.

In FIG. 6 the dashed lines indicate the respective surface worked for planar engagement on another module. Thus, from the left side of FIG. 6 all odd multiples of a unit length E can be cut off and from the right side all even multiples.

We claim:

1. A corrugator for ribbing plastic pipes comprising guide means for guiding two synchronously circulating chains of mold halves, said guide means being arranged in a production direction to form an input zone in which the mold halves are brought into engagement with each other, a molding zone in which a central channel is provided for guiding the engaged mold halves and an output zone in which the mold halves are separated from each other, said guide means including return guide channels for guiding the chains of mold halves on paths between the output and the input zones, and cooling means for cooling at least the central channel with a coolant, wherein said guide means comprises:
   a plurality of hollow profile mold guide modules for forming the molding zone, each module being formed with a central cavity for accommodating said cooling means and two oppositely disposed lateral guide portions;
   said modules being arranged in pairs in rows joining each other transversely of the production direction of the corrugator, a plurality of module pairs adjoining each other to form mold guide channels and a pair of parallel central cavities extending in the production direction;
   wherein adjoining lateral guide portions of a module pair form a section of the central channel and outwardly disposed lateral guide portions of the pair form a section of the return guide channels.

2. A corrugator according to claim 1, wherein each mold guide module is symmetrical such that each of the two lateral guide portions are interchangeable and can serve alternately as a section of the central channel and as a section of the return guide channel.

3. A corrugator according to claim 1 or 2, wherein a length (nE) of each mold guide module in the production direction is substantially an integral multiple (n) of a unit length (E).

4. A corrugator according to claim 1, wherein said cooling means comprises spray cooling means extending substantially over the entire length of each said pair of parallel central cavities to spray coolant onto a cavity wall adjoining said central channel.

5. A corrugator according to claim 4, wherein said spray cooling means also spray coolant onto walls of said central cavities adjoining respective return guide channels.

6. A corrugator according to claim 5, wherein pressure means are provided on the outside of said return guide channels for pressuring mold halves into the return guide channels.

7. A corrugator according to claim 6, wherein the pressure means are plates to which a force is applied.

8. A corrugator according to claim 1, wherein one of said rows of modules is arranged so as to be movable with respect to the transversely adjoining row.

9. A corrugator according to one of claims 4 to 8, wherein a cavity wall adjoining the central channel is provided with at least one opening such that means connectable to the central cavity may generate one of a vacuum and a pressure in said central channel.

10. A corrugator according to one of claims 4 to 8, wherein in cavity wall adjoining the return guide channel is provided with at least one opening such that means connectable to the central cavity may generate a partial vacuum in said return guide channel.

11. A corrugator according to claim 1, wherein said mold guide modules are castings.

12. A corrugator according to claim 11, wherein said castings are cast iron.

* * * * *